(12) United States Patent
Sharvit et al.

(10) Patent No.: US 11,675,508 B2
(45) Date of Patent: *Jun. 13, 2023

(54) DYNAMIC SHARED JOURNAL

(71) Applicant: EMC IP Holding Company LLC, Hopkinton, MA (US)

(72) Inventors: Erez Sharvit, Ramat Gan (IL); Jehuda Shemer, Kfar Saba (IL); Valerie Lotosh, Ramat Gan (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/649,963

(22) Filed: Feb. 4, 2022

(65) Prior Publication Data

US 2022/0155980 A1    May 19, 2022

Related U.S. Application Data

(63) Continuation of application No. 16/987,993, filed on Aug. 7, 2020, now Pat. No. 11,262,922.

(51) Int. Cl.
*G06F 3/06* (2006.01)
*G06F 9/455* (2018.01)
*G06F 16/23* (2019.01)

(52) U.S. Cl.
CPC ............ *G06F 3/0631* (2013.01); *G06F 3/064* (2013.01); *G06F 3/0619* (2013.01); *G06F 3/0665* (2013.01); *G06F 3/0673* (2013.01); *G06F 9/45558* (2013.01); *G06F 16/2365* (2019.01); *G06F 2009/45583* (2013.01)

(58) Field of Classification Search
CPC ...... G06F 3/0631; G06F 3/0619; G06F 3/064; G06F 3/0665; G06F 3/0673; G06F 9/45558; G06F 16/2365; G06F 2009/45583
See application file for complete search history.

(56) References Cited

U.S. PATENT DOCUMENTS

| | | |
|---|---|---|
| 9,225,529 B1 | 12/2015 | Natanzon et al. |
| 9,767,111 B1 | 9/2017 | Natanzon |
| 2009/0198946 A1 | 8/2009 | Ebata |
| 2012/0324163 A1 | 12/2012 | Sato et al. |
| 2016/0366016 A1 | 12/2016 | Cors et al. |
| 2019/0108157 A1 | 4/2019 | Nakagawa et al. |
| 2019/0339871 A1 | 11/2019 | Kucherov et al. |
| 2021/0271391 A1 | 9/2021 | Azaria et al. |
| 2021/0279088 A1 | 9/2021 | Kochavara et al. |

*Primary Examiner* — Sean D Rossiter
(74) *Attorney, Agent, or Firm* — Workman Nydegger (57) ABSTRACT

A system is provided that includes one or more hardware processors, and a non-transitory storage medium having stored therein instructions that are executable by one or more hardware processors to perform operations including: gathering information concerning thin journal space usage, in a thin journal, by each of a plurality of consistency groups, and the thin journal space comprises a plurality of journal blocks; computing an ideal journal block state for each consistency group; computing an achievable journal block state for each consistency group; and computing a transition step from the achievable journal block state to the ideal journal block state.

13 Claims, 7 Drawing Sheets

DYNAMIC SHARED JOURNAL

FIELD OF THE INVENTION

Embodiments of the present invention generally relate to data protection processes. More particularly, at least some embodiments of the invention relate to systems, hardware, software, computer-readable media, and methods for creating and providing a journal whose size can be dynamically adjusted, while also providing for optimized retention times for one or more users.

BACKGROUND

Journals are used as a way to capture snapshot history for multiple users. With the information in the journals, a dataset can be restored to a particular point in time using a particular snapshot. However, journals can be difficult to configure.

One particular problem concerns journal size. That is, determining the correct journal size may be difficult due to considerations such as the average throughput rate expected for the journal, the compression ratio of data stored in the journal, and various other factors. Thus, many customers might prefer to simply specify retention time, that is, the time that a snapshot will be stored in a journal before being flushed, rather than having to determine the size of the journal that will be needed.

Further, and in recognition of the fact that no journal has an unlimited size, there is a need to be able to optimize a given journal to suit multiple users. In this way, the needs of the users may be met as best they can be, given the constraints imposed by the journal size.

Finally, simply increasing journal size may not be an adequate approach to servicing the needs of multiple users. For example, allocating large journal volumes can take a significant amount of time. That is, if a customer wants large journals, it may take a relatively long time for the data protection process to begin working. In a scaled environment with many users, the total journal allocation time may be significant.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data protection processes. More particularly, at least some embodiments of the invention relate to systems, hardware, software, computer-readable media, and methods for creating and providing a journal whose size can be dynamically adjusted, while also providing for optimized retention times for one or more users.

In some example embodiments, each of a number of different consistency groups (CG) may use a single thin volume for its journal. The virtual size of the thin volume may be set to be the size of the underlying datastore, or some arbitrary large size (64 TB) to handle datastore resizing. Each CG may divide the virtual space of the thin VMDK to journal-blocks. However, the journal-block will not consume datastore space as long as the CG does not use it. Thus, the system will control the number of journal-blocks that each CG may potentially consume by providing a journal-block quota to each CG. That is, a journal-block, although allocated to a CG, may or may not actually be used by that CG. If the quota of journal-blocks for a CG is increased, the CG may add more blocks to the active pool of journal blocks. If that quota is decreased, the CG may delete journal history and release blocks from the active pool. Any released journal-blocks may be punched, such as by use of an 'unmap' command, in order to release the physical space back to the datastore.

The thin-VMDK may be used by each CG as a gateway to access the shared journal space. However, unlike a shared-VMDK which is thick provisioned and eager zeroed, the shared journal space may have thin VMDK characteristics. The allocation of the thin-VMDKs may be relatively fast, and therefore, the allocation of the shared space may be correspondingly fast. The thin-VMDKs may not consume unused space, therefore, the shared space may consume only the space it requires, and the unused datastore space may be used for other applications in the system.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that the space in a journal shared by multiple users may be allocated, and re-allocated, on a dynamic basis as conditions change. In an embodiment, unused journal space allocated to a user may be released for use by other users. In an embodiment, a user may not be required to specify a journal size. In an embodiment, one or more users may specify a desired respective retention time, thus enabling development of an optimization for use of the journal space. In an embodiment, division of journal blocks among users may be determined based on a desired retention optimization. In an embodiment, a rate of consumption of journal space may be predicted, and the consumption information may be used as a basis for determining an optimization for use of the journal space. An embodiment may provide global optimization, across multiple users such as CGs, of the use of a fixed amount of journal space.

A. General Aspects of Some Example Operating Environments

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, journal creation operations and journal management operations. Such example operations may include, but are not limited to, data replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in connection with DellEMC RecoverPoint replication systems, components such as a RecoverPoint Appliance (RPA), and methods. Such systems, components, and methods may, for example, replicate data and/or applications, and recover data and/or applications to a particular point in time. More generally however, the scope of the invention is not limited to use any particular environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, DellEMC Cloud, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

B. Context for Some Example Embodiments

The following discussion is intended to provide information and context for some example embodiments. However, this discussion is not intended to limit the scope of the invention in any way.

A consistency-group (CG) in RecoverPoint for virtual machines (VMs) may use a journal to store the snapshot history. Particularly, a journal may store a sequence of input/output operations (IOs). The customers may specify the journal size in the creation of the CG and later, if needed, the customer may increase the journal size by adding additional VMDKs, or decrease journal size by removing VMDKs. Due to the layout of the journal-stream, removing a VMDK requires erasure of all the journal history and resetting of the journal-stream. The journal-stream is cyclic in nature and, therefore, old snapshot history is deleted in order to clear space in the journal for new snapshots. Note that as used herein, a 'consistency group' embraces, among other things, a group of related volumes, applications, and/or services, that must be recovered or restored at the same time in order for them to function properly.

In general, the retention period refers to the amount of time that a snapshot is stored in the journal. A customer may desire to store a snapshot for period of a few hours to a few days, and in some cases, even weeks or months. Configuring the retention period for one or more CGs in systems such as RecoverPoint can be a complex task since the customer may have to consider a variety of parameters such as the average throughput, the compression ratio, and/or other factors that may affect the capacity of the journal. Thus, while the customer may know the desired retention time, it may be difficult for the customer to determine, given that retention time, the amount of journal space needed to support the retention requirement.

In the case of RecoverPoint, for example, journal-VMDKs may be created on datastores that are given by the customer. The journal-VMDK may thick provisioned, that is, it may allocate all the space it needs at the outset of a replication process. The allocated space of a thick provisioned VMDK, even if unused, may not be available to another user. For example, a 10 GB VMDK would consume 10 GB from the datastore. However, in a scaled environment that contains many CGs, the datastore size may not be sufficient to satisfy the retention requirements of all of the CGs and, accordingly, the datastore space must be managed efficiently in order to optimize the retention that each CG achieves.

Consider, for example, a case where a customer system includes two CGs, such as CG1 and CG2, as well as a datastore having a capacity of 5400 MB. Suppose further that the CG1 has a specified retention time of 1 hour and CG1 consumes journal space at a rate of 1 MB per second. To maintain retention, that is, to meet the specified retention time, CG1 would need a journal of 3600 MB in size (1 MB×3600 seconds). As well, suppose that CG2 has a specified retention time of 2 hours and CG2 consumes journal space at a rate of 1 MB per second. To maintain retention, CG2 needs a journal of 7200 MB in size (1 MB×7200 seconds (3600×2)). Thus, the total journal space needed by the combination of CG1 and CG2 is 10800 MB (3600+7200). As noted however, the datastore only has a capacity of 5400 MB and, as such, cannot satisfy the retention requirements of both CG1 and CG2. Thus, an optimization solution must be found that comes as close as possible to satisfying the retention requirements of both CG1 and CG2, given the constraints imposed by the datastore. A variety of approaches may be taken to retention period optimization in a system that comprises multiple CGs. The following example approaches for provisioning journal space for CG1 and CG2 are illustrative.

One optimization approach may involve consumption-proportional retention. In this approach, the datastore capacity of 5400 MB may be divided between the CGs according to the expected journal consumption of each of CG1 and CG2. In the illustrative example above, the amount of journal space assigned to each CG may be based upon the proportion of the respective specified retention times for CG1 and CG2. The proportion in this case is 1:2, since CG1 has a retention time of 1 hour, and CG2 has a retention time of 2 hours. Thus, assigning journal space based on retention time, CG1 would receive 1800 MB of journal space, and CG2 would receive 3600 MB of journal space. The CG1 journal space would correspond to 30 minutes of retention time, and the CG2 journal space would correspond to 60 minutes, or 1 hour, of retention time. Put another way, CG2 receives journal space corresponding to 2× the retention time as CG1, and each of the CGs achieves only half of its respective retention time.

Another optimization approach involves assigning an equal amount of retention time to each CG. Thus, since the 5400 MB datastore would support a total retention time of 90 minutes (30 minutes for CG1+60 minutes for CG2), 45 minutes retention time would be provided to each CG. Thus, the assigned journal space for CG1 would be (30/60)×5400, or 2700 MB, and the assigned journal space for CG2 would be (60/120)×5400, or 2700 MB. The assigned journal spaces correspond to retention time percentages of 2700/3600 or 75% of specified retention for CG 1, and 2700/7200 or 37.5% of specified retention for CG2. Thus, this example approach may tend to favor the CG with the relatively lower retention time.

An alternative optimization approach involves assigning journal space based on the respective target retention times for the CGs. Thus, and continuing with the example scenario involving CG1 and CG 2, the respective retention times are 1 hour and 2 hours. Thus, the journal space may be assigned in a proportion of 1:2, such that CG1 receives 1800 MB of journal space, corresponding to a retention time of 30 minutes, and CG-2 receives 3600 MB of journal space, corresponding to a retention time of 60 minutes.

In a final example of an optimization approach, journal space may be assigned according to an established priority as between the CGs. For example, the approach may be to either first satisfy retention of CGs with higher priority and then, within the same priority grouping, use proportional or other methods to weight the proportion according to priority. In one simple example, if CG2 has a higher priority than CG1, and the datastore has 5400 MB capacity, CG2 would receive 5400 MB journal space and CG1 would not receive any journal space.

C. Overview

Figure 1:
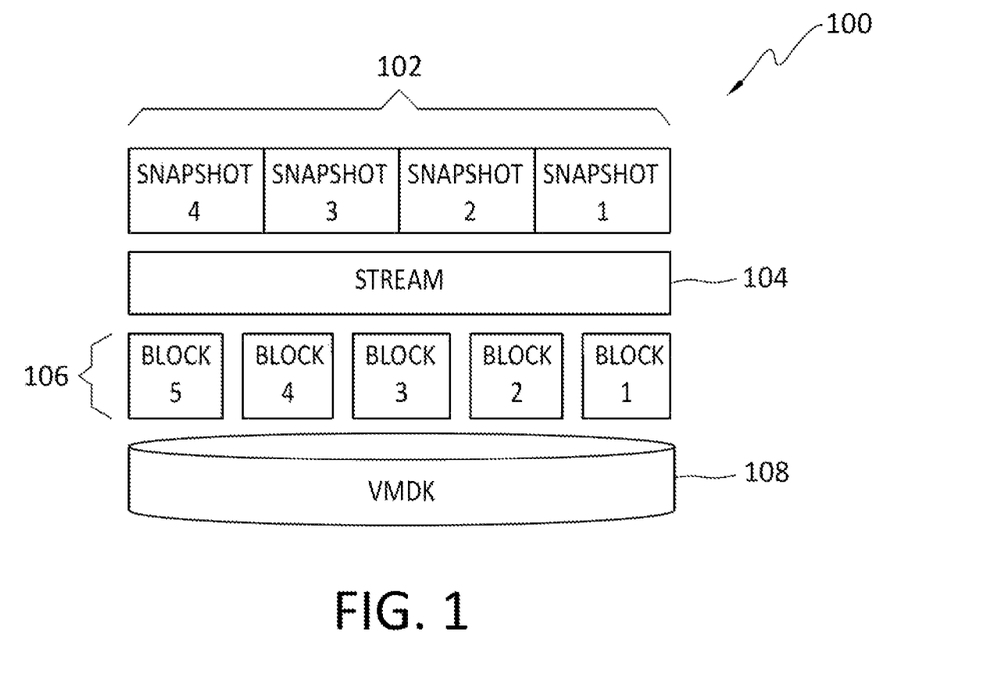
FIG. 1 discloses aspects of an example journal configuration.
Figure 2:
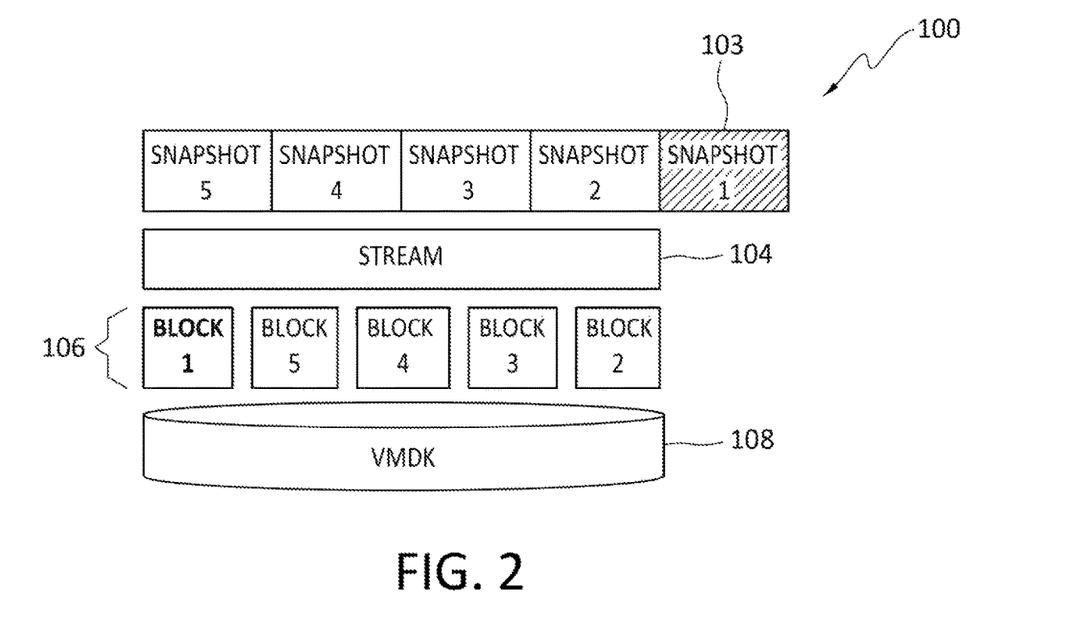
FIG. 2 discloses aspects of the handling of old and new data in a journal.

Although the example approaches disclosed above are relatively straightforward to define, they may be difficult to implement in practice. For example, IOs may not come into the journal at a steady or predictable rate, errors may occur, and IOs may come in at different times. Thus, other approaches may prove more effective in terms of assigning journal space to multiple CGs. With reference now to FIGS. 1 and 2, some background is provided concerning still other approaches to journal space allocation. In general, these approaches may involve, among other things, dynamically updating the journal content as older content ages out and is removed due to journal space constraints.

The configuration 100 in FIGS. 1 and 2 comprises a series of snapshots 102 that are stored in a cyclic stream 104, which may be referred to as an 'undo' stream. As shown in FIGS. 1 and 2, the cyclic stream 104 may comprise a single logical stream of bytes that is implemented on top of list of journal blocks 106. For example, the cyclic stream 104 may comprise data blocks, and respective metadata associated with each of the data blocks. Such metadata may comprise, for example, the time when a particular block came into the journal, the originator of the block, the owner of the block, and any other information concerning the block. Each journal block 106 may be mapped to a corresponding section in a VMDK 108. The size of the journal blocks 106 may vary, such as from 64 MB to 1024 MB for example. In order to clear space for a new snapshot history, the oldest snapshot history, snapshot '1' 103 in the example of FIG. 2, is deleted in order to free a journal block 106, namely, the tail block 1. That is, when snapshot 5 comes into the journal, snapshot 1 is removed from the journal. Once the data of the tail block is deleted, that block may be added to the head, as shown in FIG. 2, and used for storing new data.

D. Aspects of Some Example Embodiments

In order to dynamically adjust journal capacity that each CG of a group of CGS in a system will consume, various approaches may be implemented in which all the CGs in a group may use a single shared journal space. Depending upon the circumstances and system configuration, some approaches may be preferable to others. In general, these approaches may employ a shared-VMDK that can be accessed by all the CGs in the system. As noted, a journal may comprise a series of IOs, and associated metadata, that may enable a dataset such as a snapshot to be restored forward, or backward, in time relative to a particular event or time. It is important to maintain write-order fidelity in the journal so as to enable these restoration processes to be performed accurately and effectively. That is the order of the IOs in the journal reflects the order in which those IOs were written to the journal. Loss of write-order fidelity may compromise the consistency of applications or volumes. Finally, embodiments may provide for a journal adequate to meet the needs of a user and that enables a user to specify only a desired retention time, such as to meet a service level agreement (SLA) requirement for example, without requiring the user to specify a particular journal size. This may be particularly useful since, as noted herein, it can be difficult for a user to determine how much journal space is needed.

Figure 3:
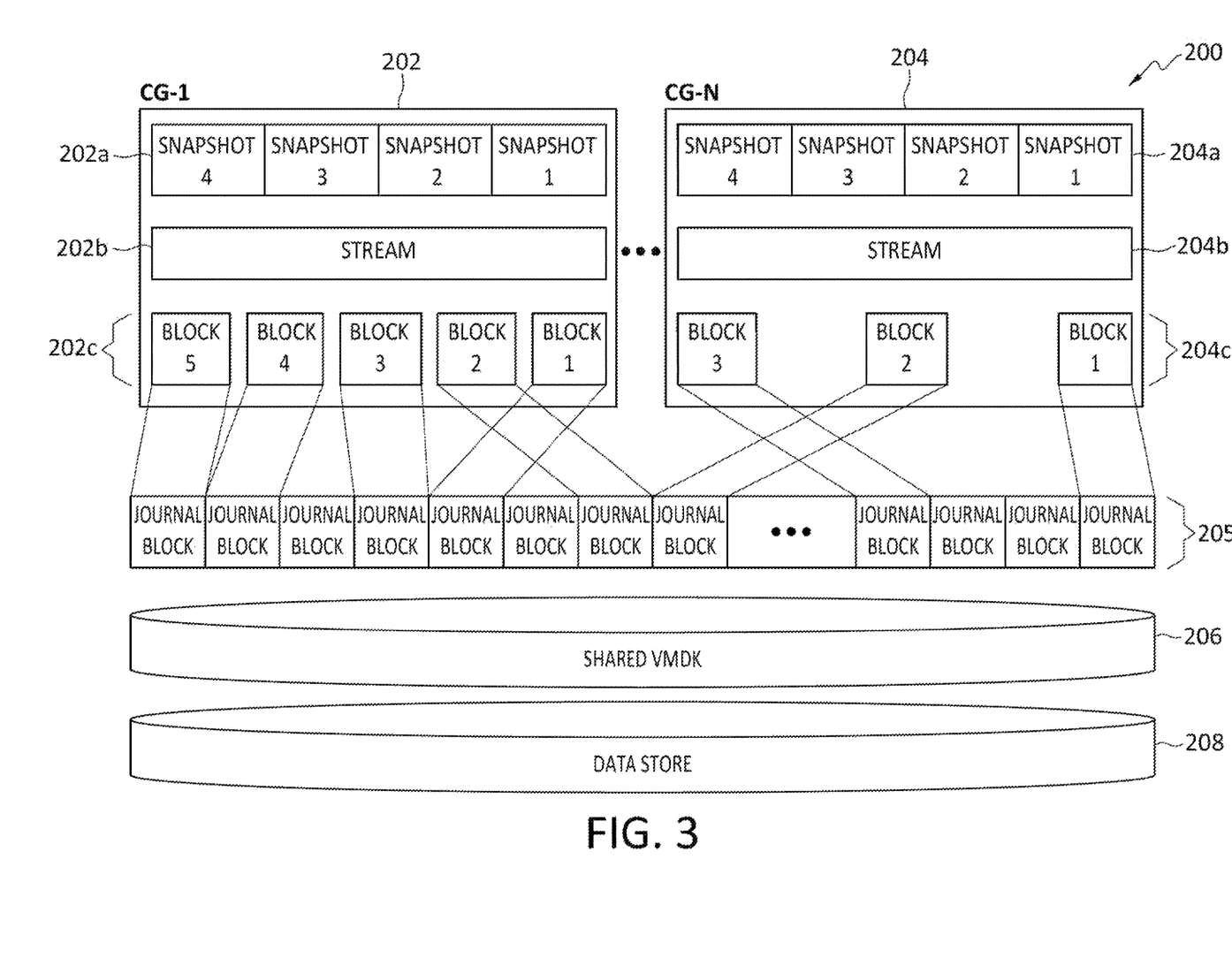
FIG. 3 discloses a configuration in which a single shared VMDK is provided to service multiple consistency groups.

In the example of FIG. 3, a system 200 may comprise any number 'n' of CGs, such as CG1 202 . . . CGN 204. Each of the CGs 202 and 204 may be associated with a respective snapshot history 202a and 204a, stream 202b and 204b, and sets 202c and 204c of blocks. As shown in FIG. 3, a volume such as a shared-VMDK 206 backed by a common datastore 208 may be divided into journal blocks 205. The journal blocks may be allocated among the CGs 202 and 204 in order to ensure that the retention-period of all CGs is maximized, if not achieved. The system 200 may continue to monitor the CGs 202 and 204 and if necessary, the system 200 may add or remove blocks from each CG 202 and/or 204. The shared blocks may work naturally with the implementation of a journal stream. As more blocks are given to the CGs 202 and 204, the respective journal size requirements associated with those CGs will naturally increase. In order to release blocks, the CG may delete old history and give back unused blocks to the system 200.

This approach may not be optimal in some cases since a shared VMDK may have to be thick provisioned, and eager zeroed. That is, space required for the shared VMDK 206 may be allocated when the shared VMDK 206 is created. Any data remaining on the physical disk 208 may be zeroed out when the shared VMDK 206 is created. Thus, the allocation of the shared VMDK 206 may take an unacceptable amount of time, and all the associated datastore space will be consumed from the beginning and, thus, unavailable to other users in the system 200. Depending upon the circumstances, this may be undesirable, such as for systems that share the datastore space with other applications, or for datastores that are thin provisioned in the underlying storage.

Figure 4:
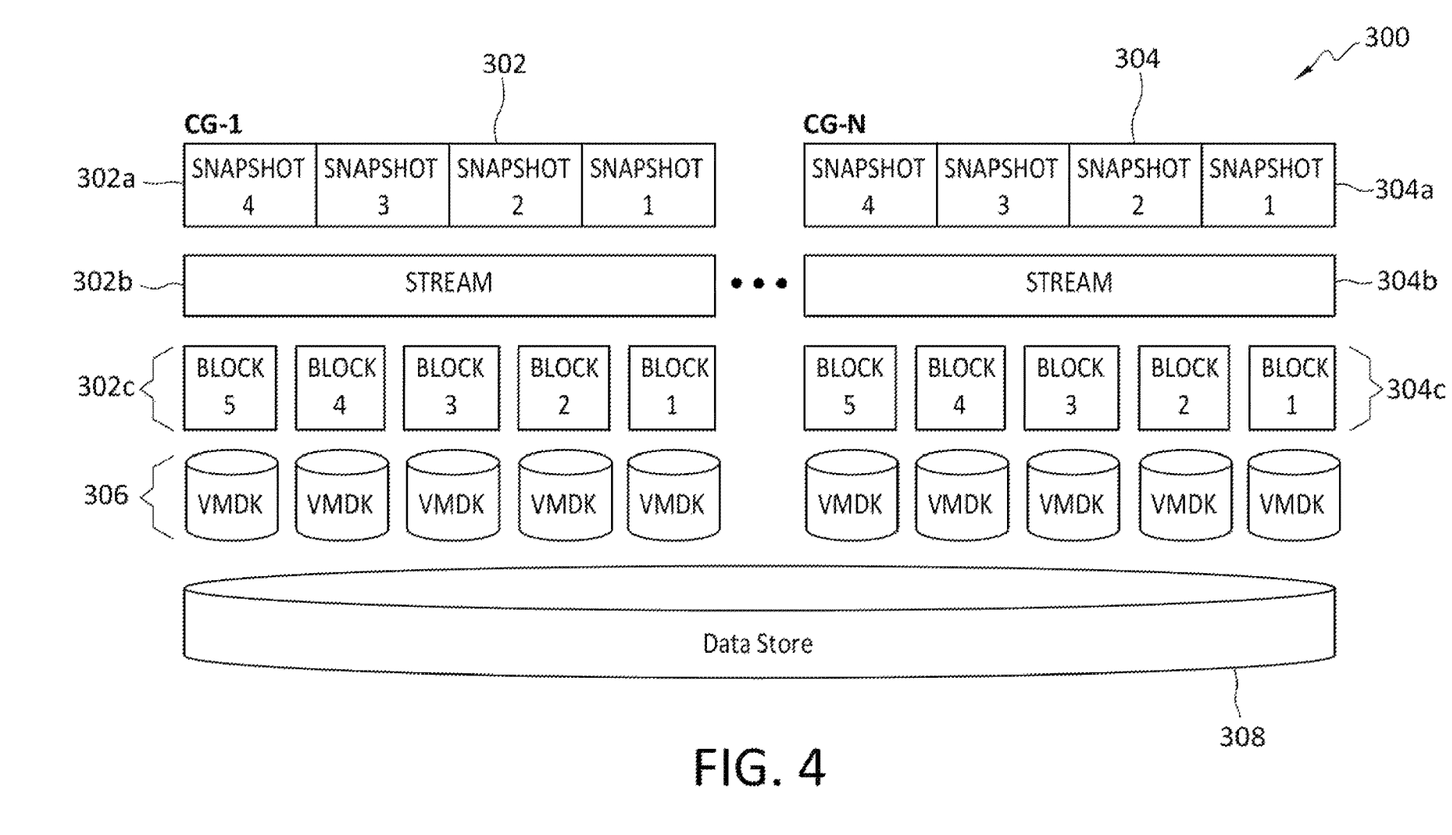
FIG. 4 discloses a configuration in which a respective VMDK is provided for each journal block of a consistency group.

With reference now to FIG. 4, another approach may involve a system 300 that may comprise any number 'n' of CGs, such as CG1 302 . . . CGN 304. Each of the CGs 302 and 304 may be associated with a respective snapshot history 302a and 304a, stream 302b and 304b, and sets 302c and 304c of blocks. In contrast with the example of FIG. 3, the example of FIG. 4 does not employ a VMDK shared by the CGs.

Instead, the system 300 may comprise a respective VMDK 306 for each of the journal blocks (not shown) to which the blocks 302c . . . 304c correspond. The VMDKs may be backed by a common datastore 308. As in the example of FIG. 3, the system 300 may divide the journal blocks on a per-CG basis. The journal blocks may range in size, for example, from 64 MB to 1024 MB. This approach may not be optimal in some cases since it may requires hundreds, if not thousands, of VMDKs. Since the total number of VMDKs may be limited by the associated virtualization infrastructure, the solution of FIG. 4 may not be practical for large environments.

Figure 5:
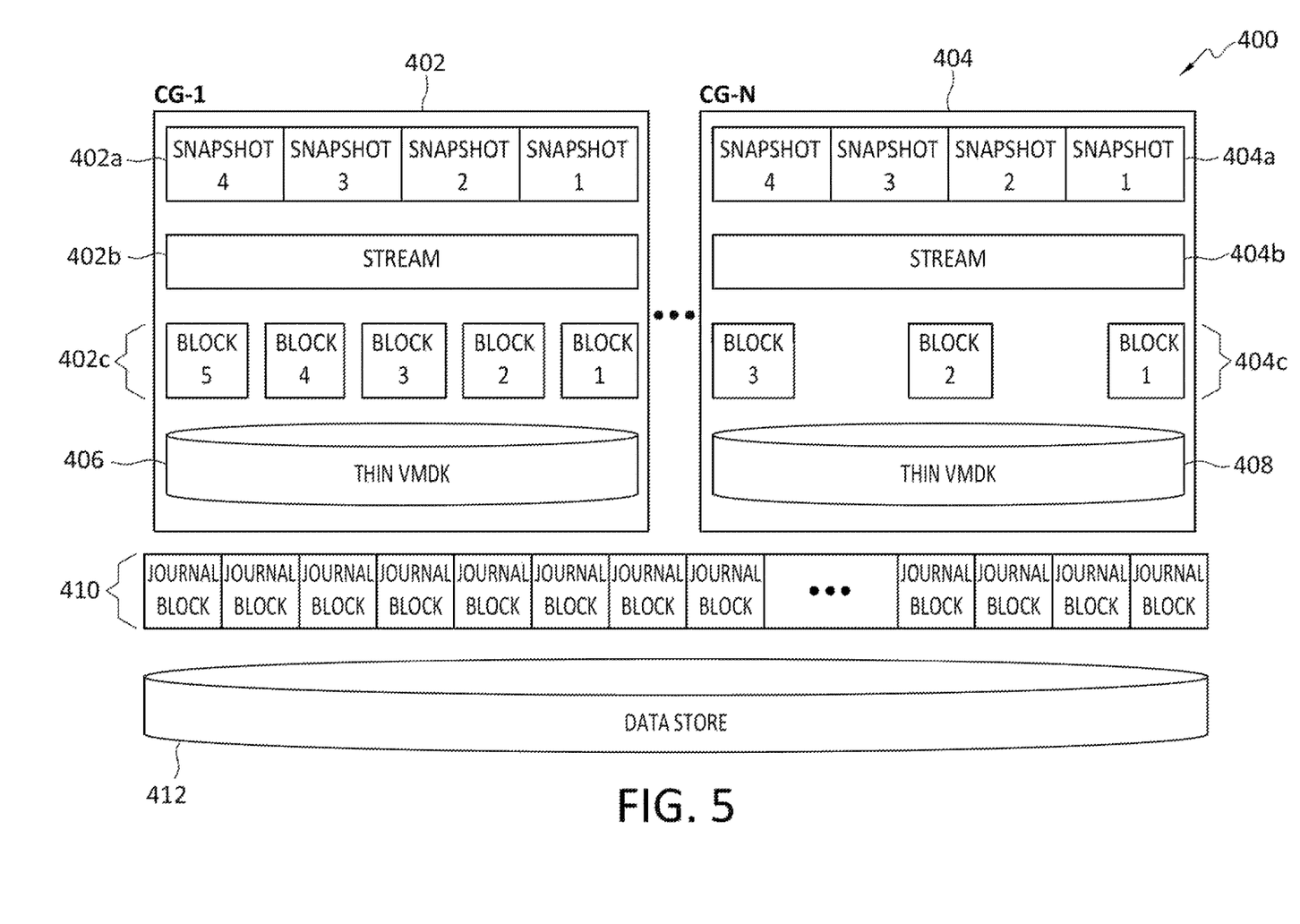
FIG. 5 discloses a configuration in which a respective thin journal is provided for each of a plurality of consistency groups.

With reference next to FIG. 5, an approach is disclosed that generally involves a thin shared space. In general, a system 400 may comprise 'N' CGs, such as CG1 402 . . . CGN 404 that may be similar to one or more other CGs disclosed in FIGS. 3 and 4 for example, in the sense that CG1 402 and CGN 404 may be associated with a respective snapshot history 402a and 404a, stream 402b and 404b, and sets 402c and 404c of blocks.

In contrast with the examples of FIGS. 3 and 4 however, CG1 402 and CGN 404 of system 400 of FIG. 5 may each comprise a respective thin volume, such as thin VMDKs 406 and 408, to serve as a journal for that CG. The virtual size of each thin volume may be set to be the size of the underlying datastore 408, or some arbitrary large size (64 TB) to handle datastore resizing. For example, the journal 410 may only be about 1 Tb in size, although 100 64 Tb VMDKs may be serviced by that journal 410. Thus, the virtual size of the thin volumes, that is, the amount of datastore 412 space being claimed by the thin volumes, may greatly exceed the actual capacity of the datastore 412 and journal 410. However, this arrangement functions because the actual datastore 412 space being consumed by the thin volumes may be relatively small.

In more detail, each of the CGs, such as CG1 402 and CGN 404, may divide the virtual space of its respective thin VMDK 406 and 408 to respective sets of journal-blocks of the journal 410. In contrast with thick provisioned journal spaces such as the VMDKs addressed in the examples of FIGS. 2 and 3, the journal blocks of the journal 410 may not consume datastore 412 space as long as the CG does not use that datastore 412 space. The VMDKs 406 and 408 may thus be referred to herein as thin journals and, as indicated, each CG may have, or otherwise be associated with, a respective thin journal. The system 400 may control the number of journal blocks in the journal 410 that each CG consumes by giving a respective journal block quota to each CG. Thus, datastore space 412 may be allocated to a CG, but less than all of that datastore space 412 may actually be provisioned to the CG and used by that CG. This may be referred to as thin allocation since datastore 412 space may be claimed by a thin VMDK, but not actually consumed by the thin VMDK.

Should the quota of journal space for a CG be increased, the CG may add more blocks to the active pool of journal blocks. On the other hand, if the quota is decreased, the CG may delete journal history and release blocks from the active pool. Any released journal blocks may be punched, such as by an 'unmap' command, in order to release the physical space back to the datastore 412.

The thin VMDKs 406 and 408 may be used, respectively, by the CGs CG1 402 and CGN 404 as a gateway to access the shared journal space. However, unlike a shared-VMDK which is thick provisioned and eager zeroed, the shared journal space has thin VMDK characteristics. The allocation of the thin VMDKs may be relatively fast, and therefore, the allocation of the shared space in the datastore 412 may be correspondingly fast. The thin VMDKs 406 and 408 may consume only the datastore 412 space that they actually require, rather than consuming the claimed space, and, accordingly, the unused datastore 412 space claimed by the thin VMDKs 406 and 408 may be used by other applications in the system 400. That is, the only datastore 412 space actually consumed may be the space that is written to by the thin VMDKs 406 and 408.

Figure 6:
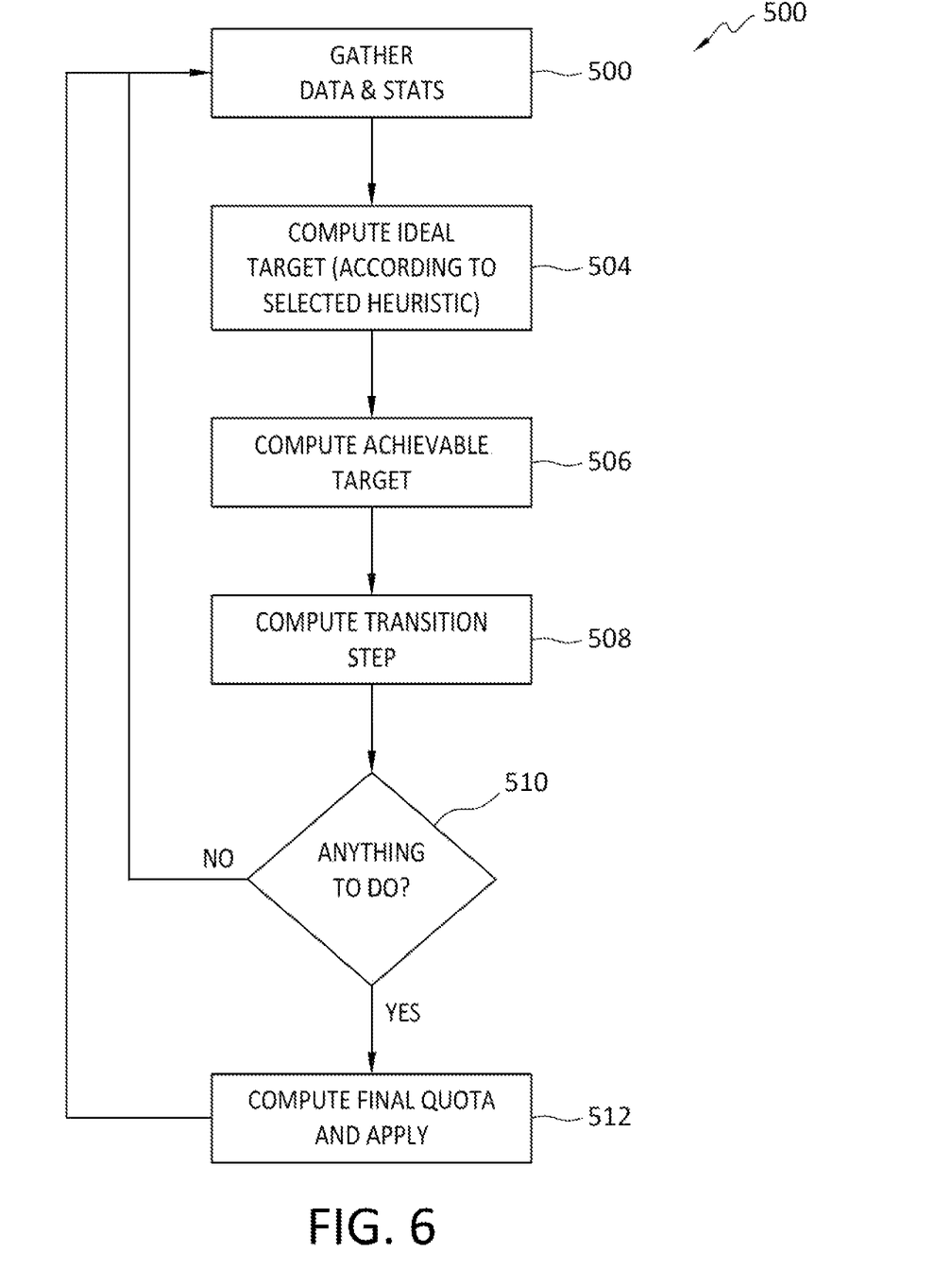
FIG. 6 discloses an example method for dividing journal blocks among multiple consistency groups.

With continued reference to FIG. 5, and directing attention now to FIG. 6, example methods are disclosed for dividing a group of journal blocks among multiple CGs, where one particular method is denoted generally at 500. It is noted with respect to the example method of FIG. 5, as well as to any of the other disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

In general, example embodiments, such as the method 500 for example, may involve an iterative comparisons of an existing state and current datastore consumption with an ideal state and predicted datastore consumption. Claimed, but unused, datastore space may be reallocated to one or more other CGs. Iterative performance of the method may result in approaching, or achieving, an ideal situation in which all of the journal space needed to support SLAs or other requirements is provided to each of the CGs in a group. Another possible result is an optimization in which all the journal space is consumed by the CGs in an optimized manner, although all requirements and SLAs may not be met.

With particular reference now to FIG. 6, a system, such as the system 400 for example, may wake up periodically and divide the journal blocks as indicated by the method 500. The method 500 may begin with the gathering of information 502, such as data and statistics. Information gathered may include, but is not limited to: target retention times for one or more, or all, CGs; journal consumption rate statistics for each CG; current journal block state for each CG, that is, used blocks of the datastore; datastore size; datastore free space; optimization method, such as proportional, equal, or priority.

Using the gathered data, at 504, a predicated journal consumption rate may be computed, and an ideal journal block state computed for each CG. At 506, an achievable journal block state is computed for each CG, based on the information gathered at 502 and the computations performed at 504. The method 500 then advances to 508 where a transition step from achievable to ideal is computed.

If no changes are determined to be needed at 510, the method 500 may return to 502. On the other hand, if a change to the journal space quotas for one or more CGs are determined 510 to be needed, the method 500 may advance to 512 where a final quota of journal space may be computed for each CG. The method 500 may then return to 502.

With continued reference to FIG. 6, further details are now provided concerning the processes disclosed there. As noted above, a predicted journal consumption rate may be computed at 504. An accurate predication of the journal consumption rate may be important for computing the correct journal block state for each CG. In order to compute the predicted journal consumption rate, each CG may report, such as every minute for example, to a statistic-database, the average rate of journal consumption by that CG. The statistics-database, depending on its capacity, may retain these consumption rate statistics for several weeks. For CGs with a relatively large retention period, the predicated consumption rate may be the average journal consumption rate of the entire duration that is stored in the statistics-database. For CGs with a relatively smaller retention period, the predication journal consumption rate may be the maximal moving average, where the size of the moving average window size may be the desired retention period.

In the example method 500, the ideal journal block state may be computed at 504. In some example embodiments, the ideal journal block quotas may be computed by dividing the datastore space between the CGs, based on a desired optimization policy, such as one of the proportional, equal, or priority, optimizations disclosed herein, and the predicated journal consumption rate. However, the ideal quotas may not necessarily be achievable since it is possible that some CGs may currently use more blocks than have been allocated to them. As a result, from the ideal computation, the quota of journal space for each CG may stay the same, increase, or decrease. Following are some example calculations for computing an ideal journal block state.

Given: N CGs, each CG having a respective Priority, a computed Consumption, and a target retention SLA.
The normalized priority $$NP_i = \frac{P_i}{\sum P_i}$$

is a number between 0 and 1.
The calculation is for weighted priority:
Consumption proportional $$CP_i = \frac{Comsumption_i}{\sum Comsumption_i}$$

and the final proportion will then be:

$NP_i * CP_i * TotalCapacity$

Similarly, SLA proportional $$SLAP_i = \frac{SLA_i}{\sum SLA_i}$$

and the final proportion will then be:

$NP_i * SLAP_i * TotalCapacity.$

In the example method 500, an achievable journal block state may be computed at 506. In some example embodiments, achievable journal block quotas may be computed by dividing the datastore free space between the CGs, as opposed to dividing the entire datastore space, that is, both the free space and the used space, for example, and the blocks that the CGs already use. As a result of the achievable journal block state computation, the quota of each CG may either stay the same or increase, but those quotas may not, or cannot, decrease.

With continued reference to the example method 500, it was noted that a transition step from an achievable journal block state, that is, an achievable allocation of journal space to CGs, to an ideal journal block state, that is an allocation of journal space to CGs that is adequate to meet SLA requirements for example, may be computed 508. In order to transition from the achievable state to the ideal state, some CGs may have to free journal blocks in order for other CGs to receive more blocks. For CGs that need to free journal blocks, the achievable quota may be higher than the ideal quota, since those CGs may ideally have fewer journal blocks. The system may sort the CGs by the number of journal blocks that need to be free, and the CGs with the relatively largest numbers of blocks to free may be selected. If there are no operations to be performed, as at 510 in the method 500, no further actions may be taken until the next evaluation period begins at 502.

Finally, the example method 500 provides for computing 512 a final journal space quota for each CG. The final quota for a CG that does not need to free blocks may be the achievable quota, and for the CGs that need to free blocks, the final quota may be the desired quota. The new quotas may be sent to the CGs, and the process of dividing the quotas may be repeated in later time after relevant CGs free blocks back to the datastore and the journal consumption rate statistics are updated.

As disclosed herein, example embodiments of the invention may comprise a variety of useful aspects. Still further aspects include the ability to extend the disclosed approaches and solutions to multiple datastores. In such embodiments, a CG may comprise a respective thin VMDK per datastore, and the journal-blocks may be divided among CGs for any available datastore. Moreover, embodiments of the invention may provide a practical way for all CGs, or multiple CGs, in a system to efficiently share a single journal space. Further, example embodiments comprise methods for dividing the journal space in a way that may optimize the retention period of one, some, or all, CGs in the system based on a desired retention optimization method. As well, the present disclosure provides techniques for creating a large thin journal space that may be shared by multiple CGs and may be accessed by multiple RPA VMs. The shared journal space may have the characteristics of a thin volume such as, for example, fast allocation time, and allocation of journal space on demand. The shared journal space may be divided to journal-blocks that align with an implementation of the RecoverPoint journal stream. The present disclosure also provides methods for optimizing retention for all CGs in the system, a method for predicting the journal rate consumption, and a method for dividing the journal blocks according to the desired retention optimization method.

E. Further Example Embodiments

Following are some further example embodiments of the invention. These are presented only by way of example and are not intended to limit the scope of the invention in any way.

Embodiment 1. A system, comprising: a plurality of consistency groups; a respective thin journal included in each of the consistency groups, and each thin journal comprises a respective thin VMDK; a journal that is shared by all of the consistency groups; and a datastore that stores journal blocks of the consistency groups.

Embodiment 2. The system as recited in embodiment 1, wherein each consistency group comprises a respective set of one or more snapshots.

Embodiment 3. The system as recited in any of embodiments 1-2, wherein each thin VMDK has a embodiment to a portion of the datastore, and the claimed portion of one of the thin VMDKs is less than an actual amount of storage in the datastore consumed by that thin VMDK.

Embodiment 4. The system as recited in any of embodiments 1-3, wherein the journal is accessible by all of the VMDKs.

Embodiment 5. The system as recited in any of embodiments 1-4, wherein the system serves multiple independent datastores.

Embodiment 6. The system as recited in any of embodiments 1-5, wherein a virtual size of one of the thin VMDKs is larger than a size of the datastore.

Embodiment 7. The system as recited in any of embodiments 1-6, wherein each of the CGs divides a virtual space of its respective thin VMDK to a respective set of journal-blocks of the journal.

Embodiment 8. A method, comprising: gathering information concerning journal space usage by each of a plurality of consistency groups; computing an ideal journal block state for each consistency group; computing an achievable journal block state for each consistency group; and computing a transition step from the achievable journal block state to the ideal journal block state.

Embodiment 9. The method as recited in embodiment 8, wherein when indicated by the transition step, the journal space quotas for one or more of the consistency groups are modified.

Embodiment 10. The method as recited in any of embodiments 8-9, wherein journal space is allocated to each of the consistency groups based on a retention optimization method.

Embodiment 11. The method as recited in any of embodiments 8-10, wherein the ideal journal block state comprises an allocation of journal space to the consistency groups that is adequate to meet a service level agreement requirement.

Embodiment 12. The method as recited in any of embodiments 8-11, wherein the achievable journal block state comprises an achievable allocation of journal space to the consistency groups.

Embodiment 13. The method as recited any of embodiments 8-12, further comprising predicting a journal space consumption rate based on the gathered information.

Embodiment 14. The method as recited in any of embodiments 8-13, wherein the journal space is consumed by a respective thin journal of each of the consistency groups.

Embodiment 15. A non-transitory storage medium having stored therein instructions that are executable by one or more hardware processors to perform operations comprising: gathering information concerning journal space usage by each of a plurality of consistency groups; computing an ideal journal block state for each consistency group; computing an achievable journal block state for each consistency group; and computing a transition step from the achievable journal block state to the ideal journal block state.

Embodiment 16. The non-transitory storage medium as recited in embodiment 15, wherein when indicated by the transition step, the journal space quotas for one or more of the consistency groups are modified.

Embodiment 17. The non-transitory storage medium as recited in any of embodiments 15-16, wherein journal space is allocated to each of the consistency groups based on a retention optimization non-transitory storage medium.

Embodiment 18. The non-transitory storage medium as recited in any of embodiments 15-17, wherein the ideal journal block state comprises an allocation of journal space to the consistency groups that is adequate to meet a service level agreement requirement.

Embodiment 19. The non-transitory storage medium as recited in any of embodiments 15-18, wherein the achievable journal block state comprises an achievable allocation of journal space to the consistency groups.

Embodiment 20. The non-transitory storage medium as recited in any of embodiments 15-19, further comprising predicting a journal space consumption rate based on the gathered information.

Embodiment 21. A method for performing any of the operations, methods, or processes, or any portion of any of these, disclosed herein.

Embodiment 22. A non-transitory storage medium having stored therein instructions that are executable by one or more hardware processors to perform the operations of any one or more of embodiments 8-14.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
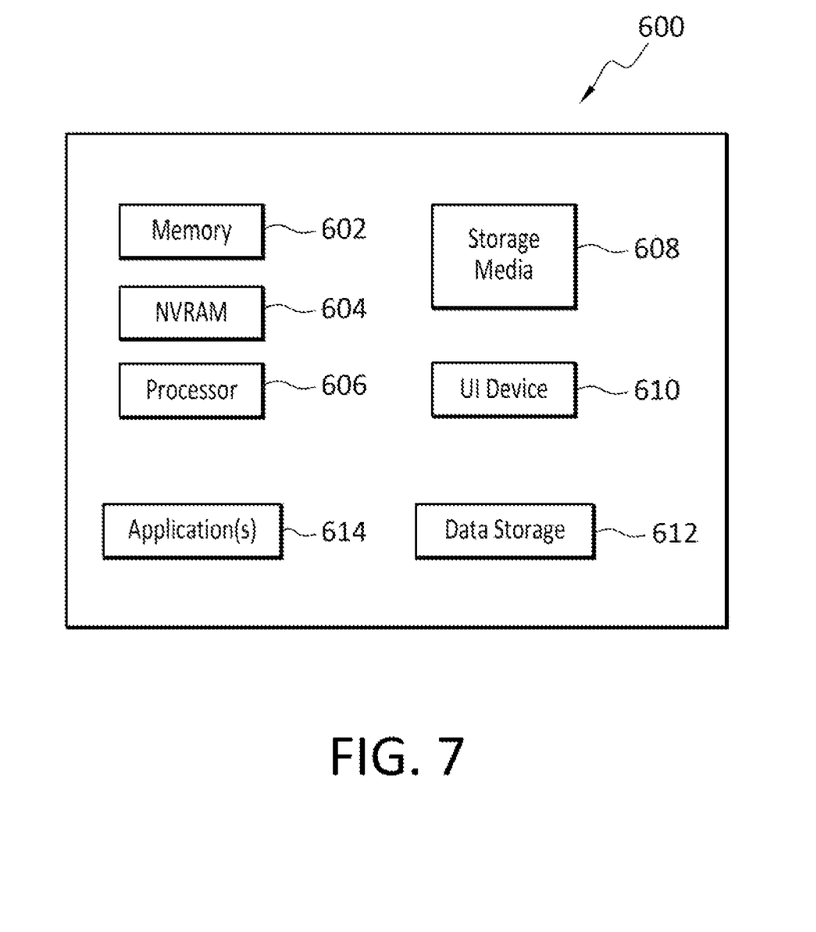
FIG. 7 discloses an example computing entity.

With reference briefly now to FIG. 7, any one or more of the entities disclosed, or implied, by FIGS. 1-6 and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 7.

In the example of FIG. 7, the physical computing device 600 includes a memory 602 which may include one, some, or all, of random access memory (RAM), non-volatile random access memory (NVRAM) 604, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system, comprising:
one or more hardware processors; and
a non-transitory storage medium having stored therein instructions that are executable by the one or more hardware processors to perform operations comprising:
gathering information concerning thin journal space usage, in a thin journal, by each of a plurality of consistency groups, and the thin journal space comprises a plurality of journal blocks;
computing an ideal journal block state for each consistency group;
computing an achievable journal block state for each consistency group; and
computing a transition step from the achievable journal block state to the ideal journal block state.

2. The system as recited in claim 1, wherein, when indicated by the transition step, a thin journal space quota for one of the consistency groups is modified.

3. The system as recited in claim 1, wherein journal blocks of the thin journal are allocated to each of the consistency groups based on a retention optimization method.

4. The system as recited in claim 1, wherein the ideal journal block state comprises an allocation of thin journal space to the consistency groups that is adequate to meet a service level agreement requirement.

5. The system as recited in claim 1, wherein the achievable journal block state comprises an achievable allocation of thin journal space to the consistency groups.

6. The system as recited in claim 1, wherein the operations further comprise predicting a thin journal space consumption rate based on the gathered information.

7. The system as recited in claim 1, wherein the computing of the achievable journal block state is performed using the information, and using the ideal journal block state.

8. The system as recited in claim 1, wherein when, after the computing, it is determined that a change to a thin journal space quota for one of the consistency groups is needed, the operations further comprise computing, for that consistency group, a final quota of thin journal space.

9. The system as recited in claim 1, wherein computing the ideal journal block state comprises dividing a datastore space among the consistency groups based on an optimization policy and a predicted thin journal space consumption rate.

10. The system as recited in claim 1, wherein computing the achievable journal block state comprises dividing free space of a datastore between the consistency groups.

11. The system as recited in claim 1, wherein the operations further comprise implementing the transition step.

12. The system as recited in claim 11, wherein implementing the transition step comprises freeing, by one of the consistency groups, a journal block, and adding that journal block to another one of the consistency groups.

13. The system as recited in claim 1, wherein space in the thin journal is shared by the consistency groups.

* * * * *